(12) United States Patent
Gold

(10) Patent No.: US 7,596,906 B2
(45) Date of Patent: Oct. 6, 2009

(54) GREEN ROOF SYSTEM AND METHODS

(76) Inventor: David Gold, 2907 SW. Periander St., Portland, OR (US) 97201

( * ) Notice: Subject to any disclaimer, the term of this patent is extended or adjusted under 35 U.S.C. 154(b) by 537 days.

(21) Appl. No.: 11/238,526

(22) Filed: Sep. 28, 2005

(65) Prior Publication Data

US 2007/0079547 A1    Apr. 12, 2007

(51) Int. Cl.
*A01C 1/04* (2006.01)
*A01G 1/00* (2006.01)
*A01G 9/02* (2006.01)
*E01C 13/08* (2006.01)

(52) U.S. Cl. .................... 47/65.9; 47/1.01 F; 47/902; 47/66.5; 47/86

(58) Field of Classification Search .............. 47/1.01 F, 47/65.9, 902, 66.5, 86, 66.1
See application file for complete search history.

(56) References Cited

U.S. PATENT DOCUMENTS

| 342,595 | A | * | 5/1886 | Gilman ........................ 47/33 |
| 5,404,671 | A | * | 4/1995 | Farrow et al. ............. 47/1.01 R |
| 6,606,823 | B1 | * | 8/2003 | McDonough et al. ........ 47/65.9 |
| 2002/0007592 | A1 | * | 1/2002 | Mischo ....................... 47/65.9 |

FOREIGN PATENT DOCUMENTS

DE    4107511 A1  *  9/1991

OTHER PUBLICATIONS

American Wick Drain Corporation Production Information (6 sheets) entitled "AmerDrain® 650 Sheet Drain"; "AmerDrain® Sheet Drain and Protection Board and Total Drain"; and AWD Amergreen™ Roof Garden System.
Colbond Building Products, Green Roof/Roof Garden Products (5 sheets), last sheet has 2003 copyright notice.
Reclamation Opportunities for Waste Carpet, Apr. 2004, printout from web site located at www.carpetrecovery.org.
Carlisle's Roof Garden Water Proofing Systems, 2005.
GreenGrid The Natural Choice for Your Roof, specifications summary.
Green Roof Blocks (ten pages of information) relating to St. Louis Metalworks Company Product.
The Green Roof Directory (one sheet) relating to Green Roof Blocks, includes recitation that photos shown therein are of a green roof pavilion installed in Missouri, Jun. 15, 2004.
The Monday Profile: Ken Unkeles, Jun. 28, 2004, Newspaper article from The Oregonian newspaper.
Article entitled, "The Innovative Green Grid System".

* cited by examiner

*Primary Examiner*—Rob Swiatek
*Assistant Examiner*—Kristen C Hayes
(74) *Attorney, Agent, or Firm*—Klarquist Sparkman, LLP

(57) ABSTRACT

In a green roof structure, containers formed of carpet, desirably of recycled carpet, are used in growing plants that are installed in the green roof system. The trays can be preplanted and installed with the plants already growing in the trays. Alternatively, the trays can be positioned as components of the green roof system, filled with plant growing medium, and planted following their installation. Desirably the trays are substantially rectangular with adjacent corners of adjacent trays interconnected when on the roof structure. Pieces of carpet cut in various shapes can be used to form the respective trays.

14 Claims, 5 Drawing Sheets

GREEN ROOF SYSTEM AND METHODS

TECHNICAL FIELD

The developments described herein relate to green roof systems, components thereof and related methods.

BACKGROUND

The term green roof refers to a roof that has been designed or modified to promote the intentional growth of plants on plant growth medium placed on the roof. In a typical construction, the existing roof structure has roofing material thereon, such as composition shingles, water impermeable membranes, or other roofing material. A water permeable roof protection layer, such as of a heavy duty fabric, is placed over the roof material to protect the roof material. A drainage layer, which may comprise, for example, aggregate or a drainage mat, is positioned over the roof protection layer to facilitate the passage of rain water off of the roof. A root barrier layer overlies the drainage layer to prevent plant roots from growing into the drainage layer wherein the roots could otherwise clog the drainage area. Plant growth medium is then supported above the root barrier layer with plants forming the green roof growing in the plant growth medium.

There are a number of advantages to green roofs. For example, green roofs retard storm water run-off. As a result, water retained on the roof can evaporate instead of running immediately off the roof where it is typically collected in storm drains. This run-off water can contain pollutants washed by the rain water from streets and other sources. Therefore, a reduction in run-off water reduces the amount of pollutant laden water that reenters streams or that is treated before being passed on. In addition, green roofs provide an added insulation factor that reduces the amount of energy required to heat or cool a home or other structure having the green roof. In addition, green roofs can enhance the life of a roof by shielding the roof from ultraviolet ray exposure and from temperature effects, such as arising from freezing and thawing cycles in many climates.

Given the many advantages of green roofs, they are becoming more and more popular. Therefore, a need exists for improved green roofs, components for such roofs, and related methods.

SUMMARY

Green roof systems, especially as they become more widely adopted, make many positive contributions to the environment.

Another environmental problem in this country involves the significant amount of trash and discarded items that are sent to landfills. These items include used carpet, such as used wall-to-wall carpet that is typically rolled up and discarded when new carpet is installed. The inventor has discovered uses for carpet in green roof systems, particularly uses of recycled, used carpet, to gain a dual ecological benefit. That is, to both encourage the environmentally positive attributes of green roof systems and using carpet that would otherwise end up discarded as a component of green roof systems.

Therefore, in accordance with one aspect of an embodiment, a green roof system comprises a roof structure with roofing material positioned thereon. At least one water permeable drainage layer is positioned over the roofing material. Desirably, at least one roofing material protective layer is positioned between the drainage layer and roofing material. In addition, a plurality of plant growing medium containing trays overlay the drainage layer. The trays desirably comprise a base and plural walls and are comprised of carpet. Plants that have been planted in the plant growing material grow within the trays to provide the green roof. In addition, a water permeable root barrier layer is positioned to block the growth of plant roots into the drainage layer.

Desirably at least some of the trays comprise recycled, used carpet, and more desirably all of the trays are formed substantially entirely of recycled, used carpet. Plant roots can grow into the carpet of the plant growth material containing trays.

The trays are desirably substantially rectangular in a cross-section with four corners. A plurality of such trays are desirably installed on a roof in side-by-side relationships with adjacent corners of adjacent trays being fastened together. In a particularly desirable form, the trays are square. The trays can be formed from individual pieces of carpet. Desirably, corner forming portions of adjacent wall portions are interconnected to form a tray.

In a specifically desirable embodiment, the roof protective layer comprises at least one sheet of water permeable fabric material. In addition, the drainage layer desirably comprises a drainage mat. In one form, the drainage mat has a plurality of water capturing cups with gaps therebetween that support the trays thereabove with water flow being facilitated through the gaps between the cups. The water capturing cups retain moisture therein that supply water to plants growing in the plant growth medium above the drainage mat. The cups are typically attached to a water permeable sheet of material, such as needle-perforated plastic. The root barrier also desirably comprises at least one sheet that is treated to retard the growth of roots therethrough and which has openings therein that are sufficiently small to permit the passage of water while blocking the growth of roots.

In one desirable approach, the trays are formed of used carpet at a location that is remote from a roof structure on which the green roof is to be installed. The trays are filled with plant growth material and planted such that plants grow in the trays at the remote location. Thereafter the trays are transported, such as on a carrier sheet, temporary transport trays, or pallets to the location of the roof structure. The trays are then positioned on the roof structure, such as being slid off the carrier sheets or removal from temporary carrier trays as they are being placed on a roof structure. Adjacent corners of adjacent trays can then be secured together.

DETAILED DESCRIPTION

The description found herein is of exemplary embodiments of a green roof system and components thereof and related methods and is not to be taken as a limitation. The invention encompasses all novel and non-obvious features and method acts disclosed herein both alone and in various combinations and subcombinations with one another except set forth in the claims below.

Figure 1:
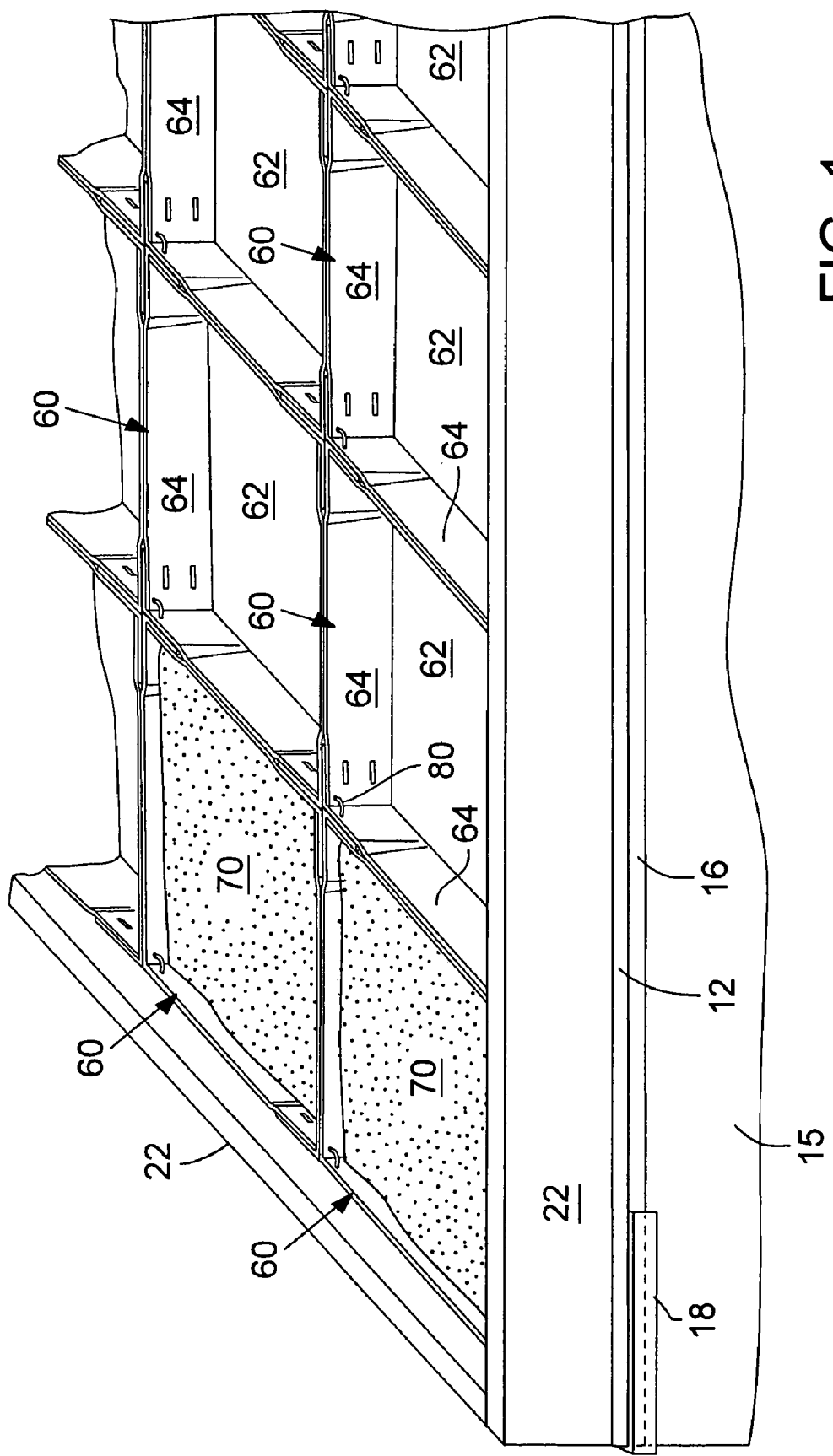
FIG. 1 illustrates a portion of a roof with a green roof system in accordance with one embodiment partially installed thereon.
Figure 2:
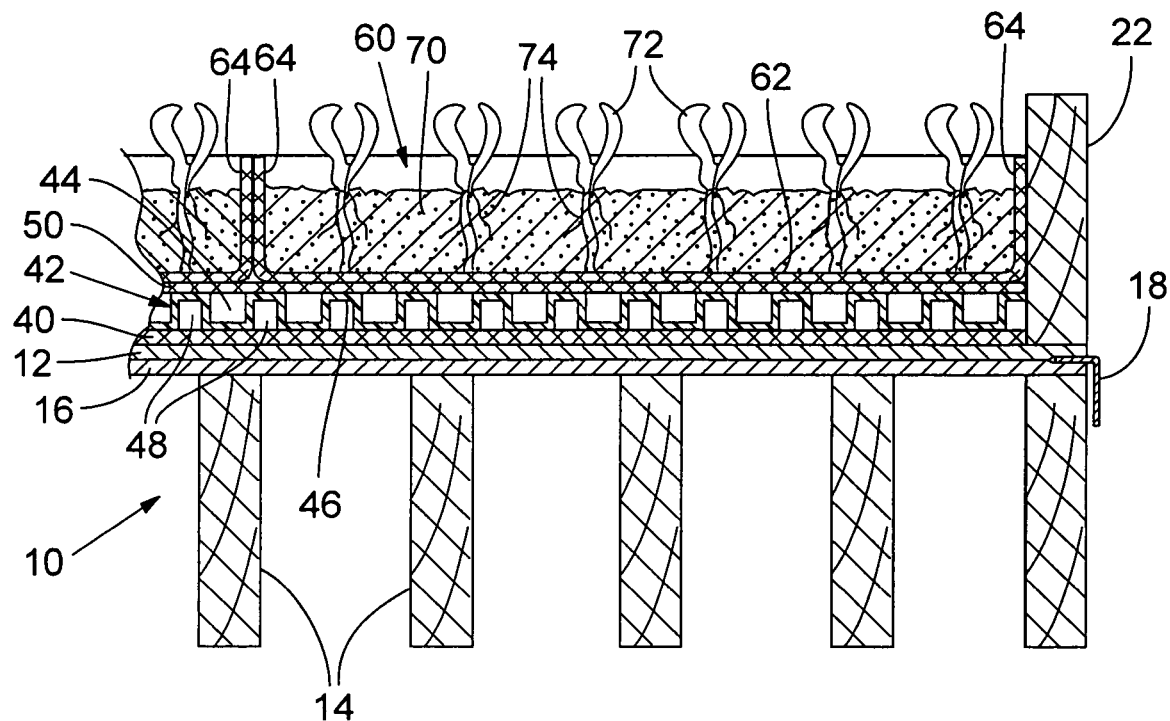
FIG. 2 is a vertical, sectional view of a portion of a green roof system installed on a roof structure in accordance with an embodiment.

With reference to FIGS. 1 and 2, an exemplary form of green roof system in accordance with one embodiment will be described. FIG. 1 illustrates a roof structure 10 with roofing material, some of which is indicated by the number 12 on the roof structure. In FIG. 2, the roof structure 10 is shown as including a plurality of spaced apart, elongated roof joists 14 with roof sheathing 16 supported by upper edges of the roof-joists. The roofing material 12 is shown overlying the sheathing. The roofing material can comprise any suitable roofing material, such as water impermeable membranes, composition shingles or other roofing material. Portions of some angular flashing 18 is also shown along one edge of the roof structure in FIGS. 1 and 2. A portion of one of the building walls that supports the roof structure is also indicated at 15 in FIG. 1.

Referring again to FIG. 1, the roof area on which the green roof is to be supported is desirably bounded by a frame 22 along sides of the roof structure that are not bounded by a wall. The illustrated frame is formed of wood, such as two-by-fours, although any suitable boundary defining material can be used. The frame and wall surrounding the green roof provides support for the walls of abutting or adjacent plant growth medium containing trays positioned on the roof.

Although not visible in FIG. 1, desirably at least one water permeable drainage layer is positioned over the roofing material. In addition, desirably at least one roof protection layer is positioned between the drainage layer and the roof material. In addition, desirably a water permeable root barrier layer is positioned over the drainage layer to block the growth of plant roots into the drainage layer. These various components can take many forms. For example, the drainage layer can comprise aggregate through which water can flow to the edge of the roof. In the embodiment shown in FIG. 2, the roof protective layer is indicated at 40 and can comprise suitable sheet material, such as needle-punched, non-woven polypropylene fabric. Other materials, desirably water permeable materials, can be used for this purpose. In addition, in FIG. 2 the drainage layer comprises a sheet of material 42 having a plurality of water impermeable capturing cups therein, one of such cups being indicated by the number 44 in FIG. 2. The cups 44 in this example are interconnected at their upper edges by a sheet in which the cups have been formed. The sheet is of a water permeable material. A portion of the cup connection sheet is indicated by the number 46 in FIG. 2. As one specific example, the sheet 46 material can have tiny needle hole perforations formed therein to permit water to flow through the sheet material into gaps, one of which is indicated by the number 48, between the cups. The cups comprise in this example one form of a support for establishing spacing between the roof material and growing plants. Water can flow through these gaps and off of the roof. In addition, air can flow through these gaps as well.

An exemplary material for this specific type of drainage mat is polystyrene having a compressive strength of 15,000 pounds per square foot. The cups, in one example, have a water storage capacity of 0.06 gallons per square foot. The perforation opening area of the sheet 46 can be, for example, 3.9 square inches per square foot. Exemplary rates of horizontal flow with a roof gradient of from 0.1 to 1.0 is from 6 gallons per minute per square foot to 16 gallons per minute per square foot. The water permeable root barrier layer can comprise at least one sheet, such as indicated at 50. An exemplary root barrier sheet material is needle-punched, non-woven polypropylene treated with a root barrier coating, such as copper hydroxide. The materials are not limited to these specific examples. The layers 40, 42 and 50 can be secured together to provide a uniform mat structure. An exemplary three component mat is available from American Wick Drain Corporation of Monroe, N.C., and is designated Amergreen 50 RS. Other grids and supports can be used to space plant containing trays from the roof material. The trays can also be placed directly on root barrier material overlaying drainage aggregate. Also, grids or other supports can be secured to or positioned beneath the undersurface of trays to support the trays above the roof material.

Referring to FIG. 1, a plurality of trays, some of which are numbered 60, are positioned on the roof structure and more specifically over the root barrier layer (see FIG. 2). These trays 60 are comprised of carpet and most desirably are comprised of recycled, used carpet. The illustrated trays 60 have a base 62 and a plurality of walls, two of which are indicated by the number 64 in FIG. 1. Desirably, the walls of adjacent trays are not separated by any rigid spacing material as walls of adjacent trays, although flexible when comprised of carpet, provide adequate support for adjacent trays.

Although trays of other shapes can be used, in one desirable form the trays are of a substantially rectangular cross-sectional shape and more desirably are of a square cross-sectional shape. An exemplary tray can be 18 inches by 18 inches to 36 inches by 36 inches with 26 inches by 26 inches being a desirable example. A 26 inches by 26 inches tray will fit within a standard bread holding tray (e.g. of plastic) that can be temporarily used to support the tray when plants are being grown therefrom at a site that is remote from the site of the green roof structure. These dimensions can be varied.

FIG. 1 also illustrates a number of the trays 60 filled with plant growth medium 70. The plant growth medium is any medium capable of sustaining plants growing in such medium and typically will be a mixture of soil and other accruements, such as fertilizers and in some cases super absorbent particles for assisting in retaining water in the soil. FIG. 2 illustrates a plurality of plants (a few which are indicated at 72) growing in the plant growth medium. The plants have roots 74, some of which are shown penetrating the carpet, for example, the base 62 of the trays. An exemplary carpet is comprised of synthetic fibers fastened to a base. The term plants is defined broadly to encompass seeds or other plant propagative material that can grow into plants with roots and leaf structures As can be seen in FIG. 1, when the trays are aligned on the roof, desirably the adjacent corners of the trays are positioned near one another and are secured together. For example, cable ties, one of which is indicated by the number 80 in FIG. 1, can be used to interconnect the walls at the corners of the trays. Cable ties are conventional and are typically made of plastic and therefore resist biodegradation. In addition, in event one or more trays need to be removed for access to the roof, the cable ties can be cut to allow separation of the trays to be removed from one another. Alternative forms of fasteners can also be used, but, in the most desirable embodiments, the fasteners are desirably removable.

Figure 3:
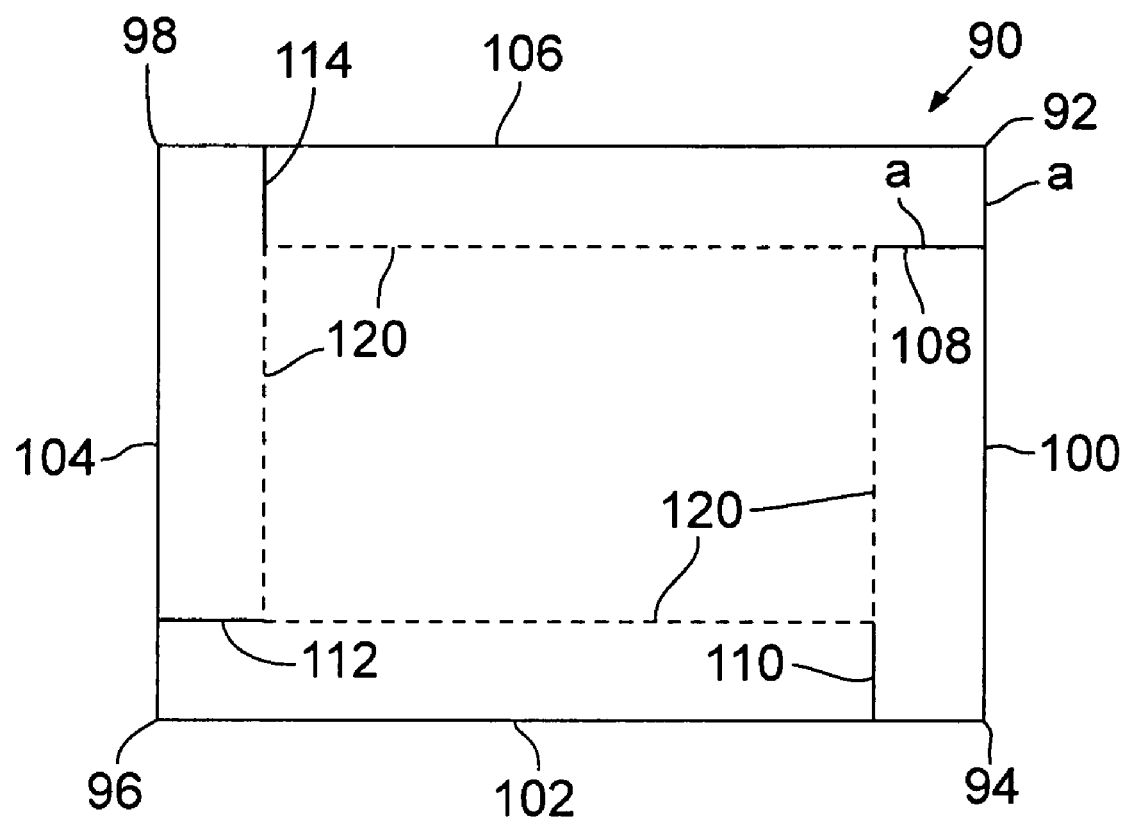
FIG. 3 illustrates a piece of carpet, such as used carpet, that has been cut to facilitate forming the carpet piece into a tray having sidewalls and a base.
Figure 4:
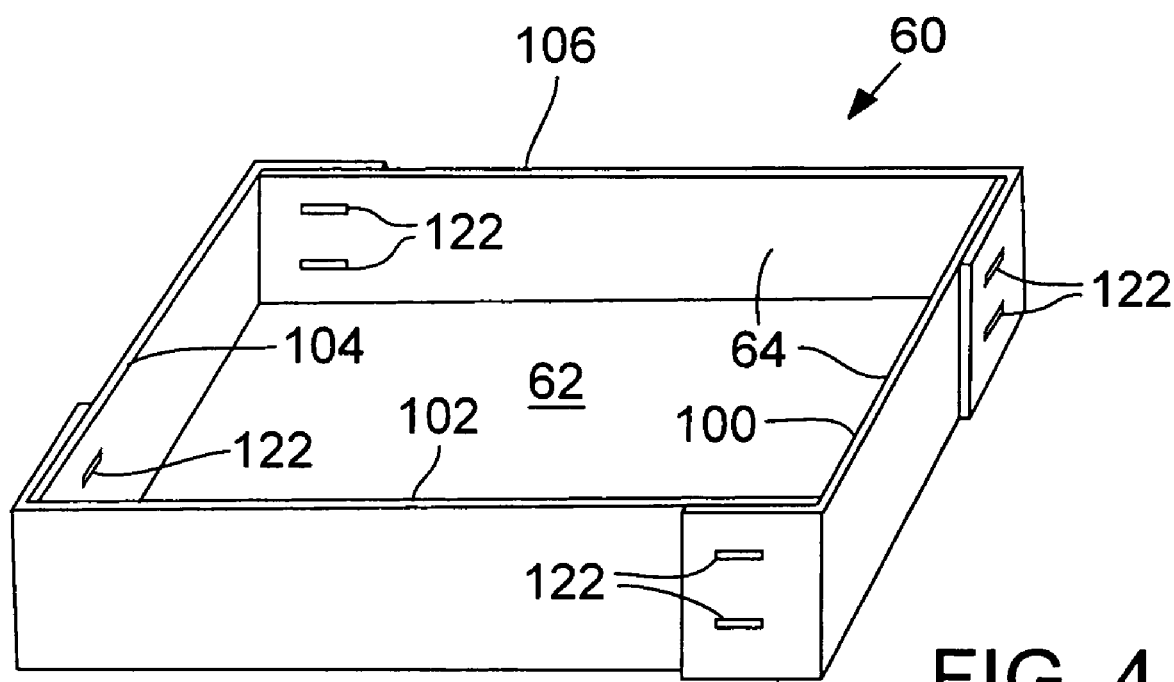
FIG. 4 illustrates an exemplarily tray formed from the carpet piece of FIG. 3.

FIG. 3 illustrates an exemplary piece of carpet used to form a tray in accordance with one embodiment. The carpet is indicated at 90 in FIG. 3 with respective corners 92, 94, 96 and 98. The carpet piece 90 also has respective side edges 100, 102, 104 and 106. A first inwardly directed slit 108, desirably extending 90 degrees to side edge 100 in the case of a square piece of carpet 90, is shown. Slit 108 extends inwardly a distance "a", which, in one embodiment, corresponds to the height of the walls of the tray when the tray is formed. In addition, the slit 108 is spaced by the distance "a" from corner 92 along side edge 100. Similar slits 110, 112 and 114 are also provided and extend inwardly respectively from the side edges 102, 112 and 114. Fold lines for the tray are indicated by dashed lines 120 in FIG. 3. The carpet piece is then folded, desirably carpet side up and backing side down, such as shown in FIG. 4. In FIG. 4, a corner portion of each wall overlaps an end portion of the adjacent wall and these overlapping portions are secured together to form the tray. Any suitable fastener can be used for securing the wall portions together, such as cable ties, stitching, rivets, bolts and so forth. However, in the embodiment shown in FIG. 4, stainless steel staples, two of which are indicated at 122, are used for this purpose.

Figure 5:
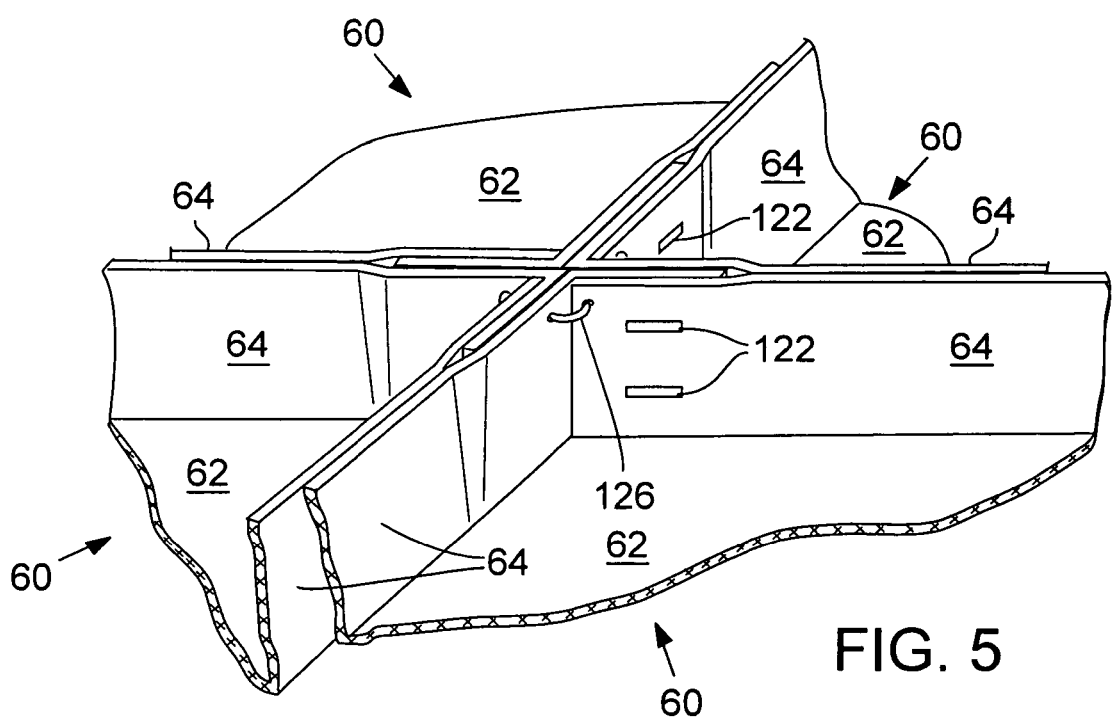
FIG. 5 illustrates portions of four trays of the FIG. 4 form shown positioned in a corner-to-corner arrangement and with the corners being secured together.
Figure 2A:
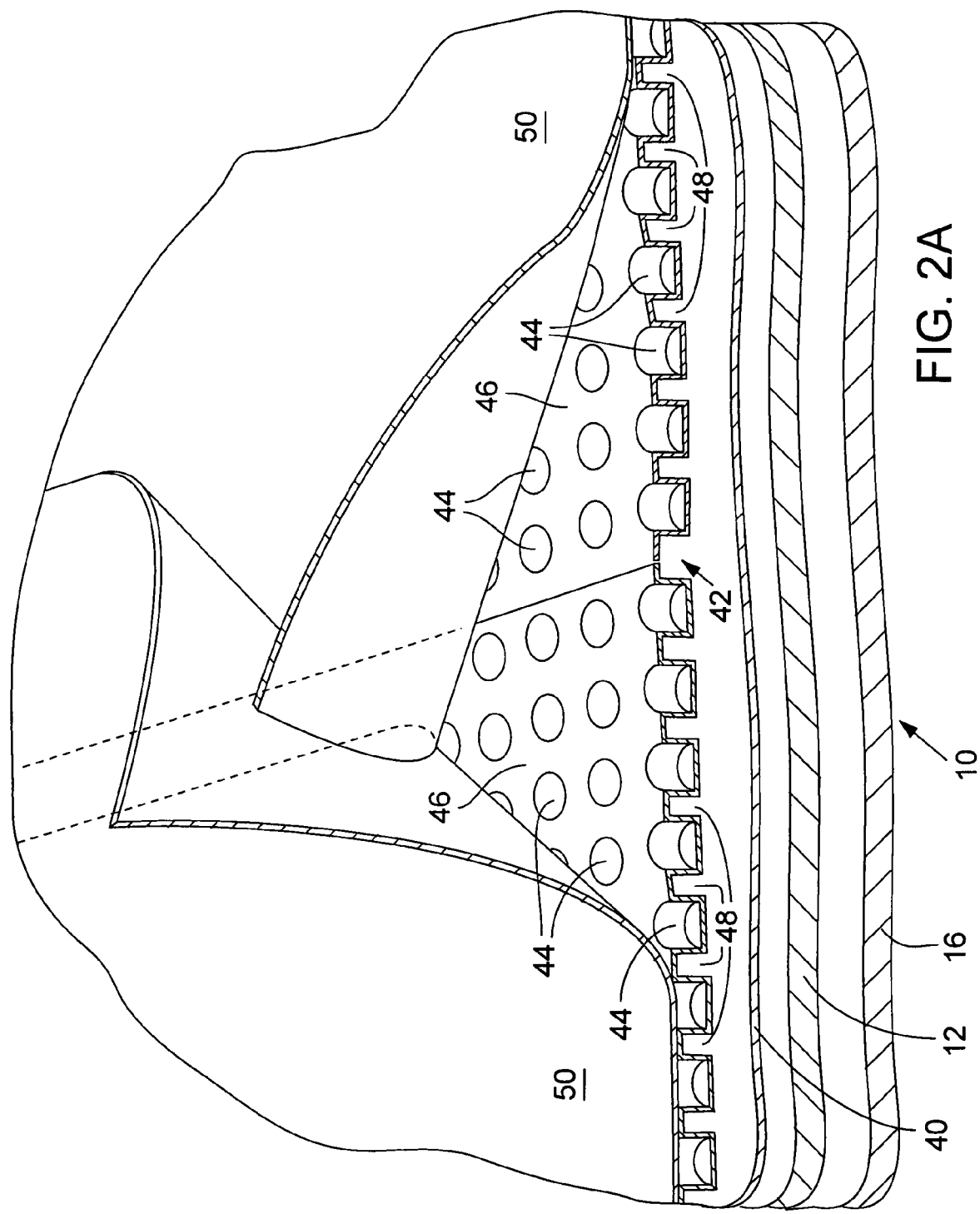
FIG. 2A illustrates an exemplary multi-layered structure comprising a roof protection layer, a drainage mat layer, and a root barrier layer.

FIG. 5 illustrates portions of four of the trays 60 shown with adjacent corners of adjacent trays positioned in an abutting relationship as in an exemplary placement on a roof structure. Desirably the corners of these trays are interconnected following their installation in place, preferably by one or more detachable interconnection mechanisms. Although various types of connection mechanisms or fasteners can be used, in FIG. 5, a cable tie 126 is shown threaded through respective openings through the corner portions of walls of each of the trays 60. In the event one of the trays needs to removed, for example, to provide access to the roof structure for repair, the interconnect mechanisms associated with the tray or trays being removed can be disconnected, such as by severing the appropriate ties 126 to allow removal of the tray or trays. The tray or trays being removed can be lifted, for example, and slid onto a carrier such as a sheet of plywood for support and removal during repair of the roof structure.

Figure 6:
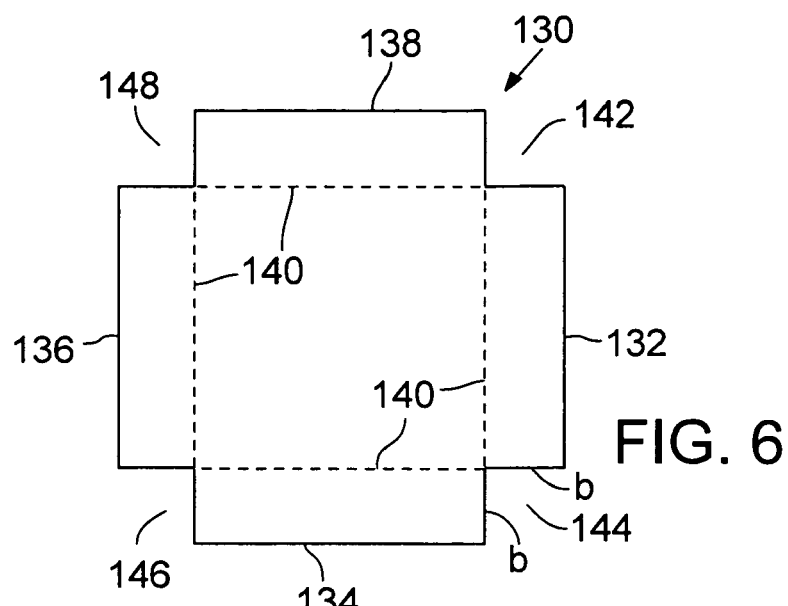
FIG. 6 illustrates a piece of carpet that has been cut in an alternative form for use in forming another exemplary tray.
Figure 7:
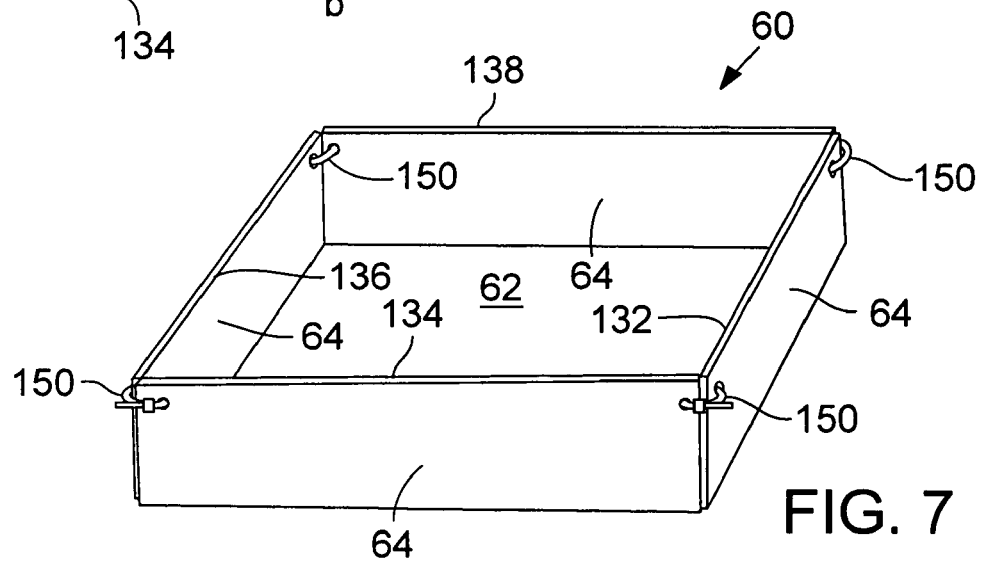
FIG. 7 illustrates an exemplary tray formed from a piece of carpet of FIG. 6.

FIG. 6 illustrates an alternative form of a piece of carpet 130 used to form a tray. In the FIG. 6 embodiment, the piece of carpet 130 has respective outer edges 132, 134, 136 and 138 that form the upper edges of the assembled tray as shown in FIG. 6. Fold lines 140 are also shown as dashed lines in FIG. 6. The corners of the carpet piece are notched, for example, by removing a square section at each corner having a depth "b" that corresponds to the height of the walls of the eventual tray. The respective notched areas are indicated at 142, 144, 146 and 148 in FIG. 6. The tray is assembled by folding the side wall forming members of the tray along the fold lines 140 in an upward direction (desirably carpet side up and backing side down, although this is not required) as shown in FIG. 7. Some of the side walls in FIG. 7 are indicated by the numbers 64 and the base of the tray in FIG. 7 is indicated by the number 62. End portions of the side walls that are adjacent to one another are fastened together, with any suitable fastener being used. For example, the fasteners can be cable ties, such as indicated by the number 150 in FIG. 7 for one such tie. The trays of the form shown in FIG. 7 can be positioned with respective corners of the trays adjacent to one another, such as shown in FIG. 5, with the adjacent corners then being desirably fastened together.

FIGS. 3 and 6 are two examples of trays formed from pieces of carpet, desirably from recycled, used carpet. Other carpet piece tray forming blanks and fold patterns can also be used.

Figure 8:
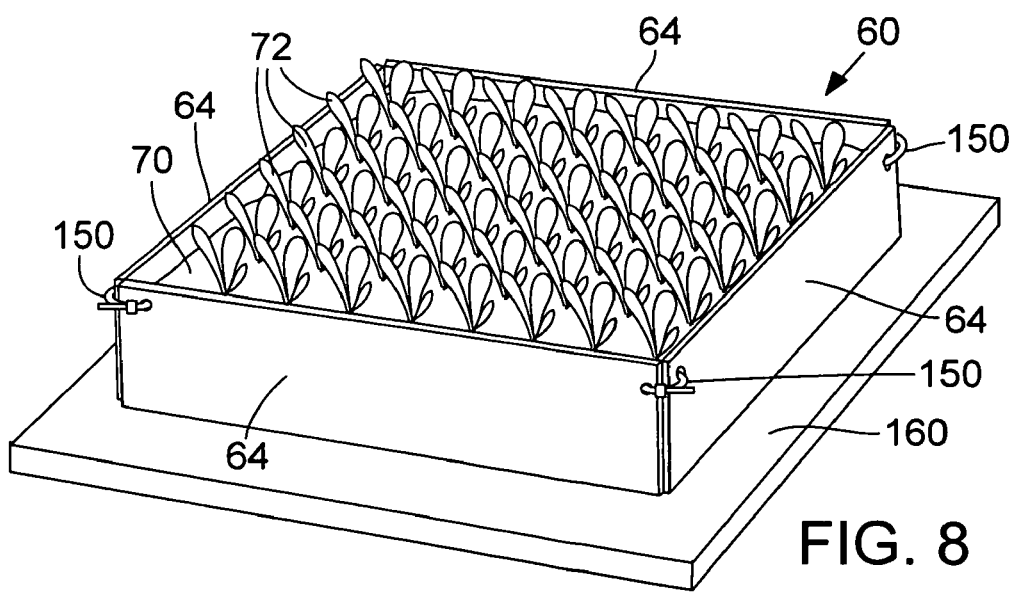
FIG. 8 illustrates a tray that contains growth medium with plants growing therein at a location remote from the roof structure on which a green roof is to be installed, the tray in FIG. 8 being shown on a carrier in the form of a sheet from which the tray can be slid off the carrier into position on the roof structure when installed.

FIG. 8 illustrates a tray 60 that has been filled with plant growth medium and planted to grow plants 74 that are shown growing in the tray 60. The tray 60 in FIG. 8 is an example of a tray that has been planted at a location that is remote from the roof structure on which the tray is to be installed. More particularly, a plurality of such trays are desirably preplanted to provide enough preplanted trays for the green roof that is to be installed. The preplanted trays can be transported, such as by positioning them on a carrier 160, such as a sheet or partial sheet of plywood. The trays can also be transported by support trays, such as bread trays, that are removed when the plant containing carpet trays are installed. The carrier can be larger to accommodate plural trays. In addition, the carriers can be palletized. Alternatively, the trays can be positioned directly on pallets for transportation to the site of the roof structure. At the construction site, the preplanted trays are positioned on the roof structure and installed in place. For example, carrier sheets can be used to carry the trays to provide support for the trays as they are moved into a position. The trays can be slid off the carrier sheet when placed on the roof structure. It is desirable to provide support for the preplanted trays when they are transported for installation because carpet trays comprise a non-rigid plant growth supporting container.

Having illustrated and described the principles of my invention with reference to various embodiments, it should be apparent to those of ordinary skill in the art that the invention may be modified in arrangement and detail without departing from such principles. I claim as my invention all such embodiments as fall within the scope and spirit of the following claims.

I claim:

1. A green roof system comprising:
   a roof support structure;
   roofing material positioned on the roof support structure;
   at least one water permeable drainage layer over the roofing material;
   a plurality of plant growing medium containing trays overlying the drainage layer, the plurality of trays each comprising a base of carpet and upright walls of carpet joined to the base, each base and joined walls defining a plant growth medium containing tray;
   plants growing in the plant growing medium contained within the trays; and
   a water permeable root barrier layer positioned to block the growth of plant roots into the drainage layer.

2. A green roof system according to claim 1 wherein at least some of the plurality of trays comprise recycled used carpet.

3. A green roof system according to claim 1 wherein all of the plurality of trays are formed substantially entirely of recycled used carpet.

4. A green roof system according to claim 1 wherein the plants have roots penetrating the carpet of the plurality of trays.

5. A green roof system according to claim 1 wherein the said plurality of trays are substantially rectangular in cross-section with four corners formed by the upright walls, wherein the upright walls of each tray of the plurality of trays are fastened together at the corners to form the tray, and wherein adjacent corners of adjacent trays are fastened together by removable fasteners.

6. A green roof system according to claim 5 wherein the plurality of trays are substantially square.

7. A green roof system according to claim 5 where adjacent walls of plural trays have respective side surfaces that abut one another.

8. A green roof system according to claim 5 wherein the removable fasteners are cable ties that are severed to permit their removal.

9. A green roof system according to claim 1 wherein each of the plurality of trays comprises a base and plural walls, each tray being formed by fastening together corner forming portions of adjacent wall portions of the tray.

10. A green roof system according to claim 1 wherein the water permeable drainage layer comprises a drainage mat having water capturing cups formed therein, the water capturing cups supporting the trays so as to provide gaps between the cups, the root barrier layer comprising at least one root barrier sheet positioned above an upper surface of the drainage mat, the at least one root barrier sheet overlying the cups, and at least one roof protection sheet positioned below a lower surface of the drainage mat and overlying the roof structure.

11. A green roof system according to claim 10 wherein the plants have roots that penetrate the carpet of the trays.

12. A green roof system according to claim 1 wherein the trays have plants preplanted into the plant growth medium prior to installation on the roof structure.

13. A green roof system according to claim 12 wherein roots of the plants penetrate the carpet of the trays prior to installation of the preplanted trays on the roof structure.

14. A green roof system according to claim 1 wherein the walls and base of each tray are made from a single piece of carpet.

* * * * *